United States Patent [19]

Wolff

[11] Patent Number: 4,497,053
[45] Date of Patent: Jan. 29, 1985

[54] ACCURATELY TRACKING PHONOGRAPH ARM

[76] Inventor: Andrew M. Wolff, 1572 Meadow La., Mountain View, Calif. 94040

[21] Appl. No.: 366,832

[22] Filed: Apr. 9, 1982

[51] Int. Cl.³ .............................................. G11B 21/16
[52] U.S. Cl. .................................. 369/244; 369/250; 369/255; 369/256
[58] Field of Search ................ 369/250, 255, 256, 244

[56] References Cited

U.S. PATENT DOCUMENTS 2,052,506  8/1936  Volk .
2,983,517  5/1961  Klein .
3,005,059 10/1961  Raabe .................................. 369/244
4,111,433  9/1978  Raabe .................................. 369/244

FOREIGN PATENT DOCUMENTS 741639 12/1955 United Kingdom .
706867 12/1979 U.S.S.R. .

Primary Examiner—Steven L. Stephan

[57] ABSTRACT

A phonograph tone arm cartridge rotating system that keeps the cartridge perpendicular to the record groove radius by pivoting it with a belt and pulley linkage that does not change length or tension during movement of the tone arm.

5 Claims, 5 Drawing Figures

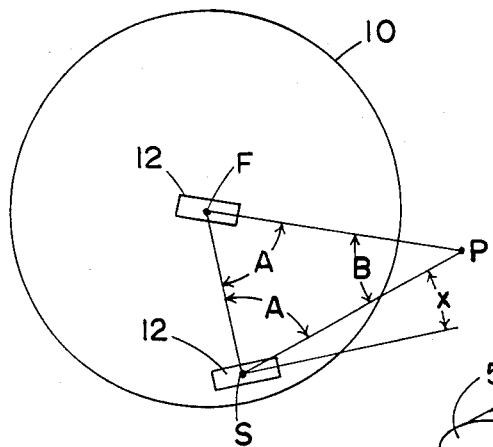
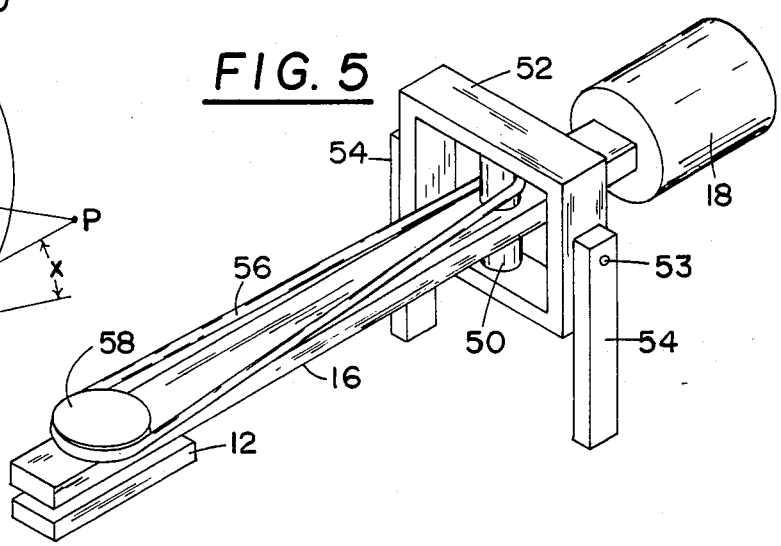
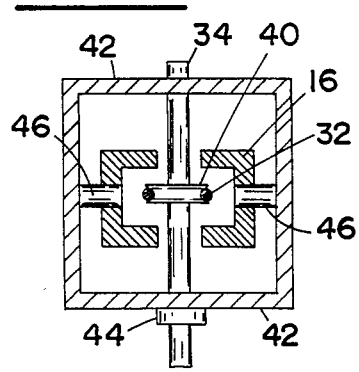
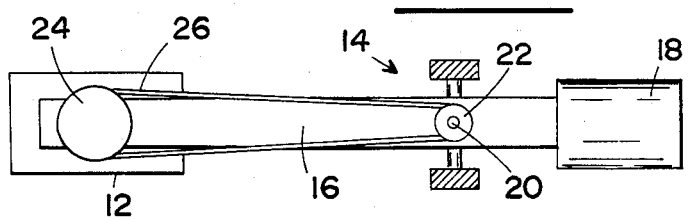
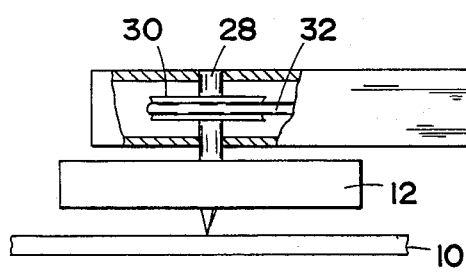
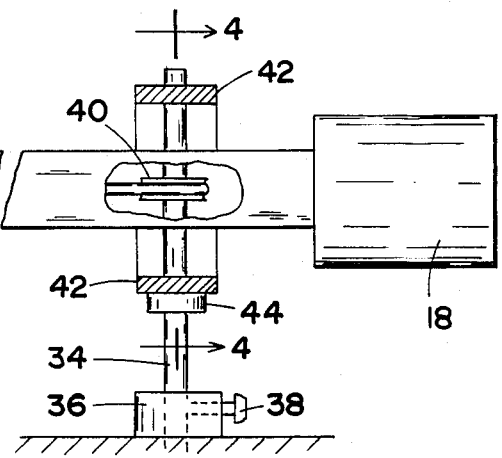

ACCURATELY TRACKING PHONOGRAPH ARM

BACKGROUND OF THE INVENTION

Phonograph records are made by impressing information into the grooves with a mechanism that is always held perpendicular to a radial line on the record. Accurate reproduction is thus achieved by keeping the stylus/cantilever axis on the playback cartridge in the same orientation. But this has been very hard to do at a reasonable cost.

Prior art record players that use a simple, low cost, pivoted tone arm carry the cartridge through an arcuate path across the record. The cartridge continuously changes its angular position relative to the groove radius: this is unacceptable for high fidelity sound reproduction and therefore higher cost turntables often use linear tracking schemes. These actually shift the pivot point of the tone arm so as to keep the arm more or less tangent to the grooves. But even these complicated and expensive devices do not track perfectly because, before they can correct the tracking, they must let the error become large enough to accommodate eccentric spindle holes and the marked spiral nature of the inner grooves. In addition, they usually correct only in the forward direction. My invention avoids these problems.

SUMMARY OF THE INVENTION

Briefly, the present invention provides perfect geometrical tracking while still using a low cost pivoted tone arm. This is done with a unique implementation of the geometric principle that if the playing stylus follows an arc that passes through the center of the record, the cantilever may be maintained perpendicular to the groove radius by rotating it relative to the tone arm at an angular rate which is half the angular rate of the tone arm itself. This mathematical principle is recognized in U.S. Pat. No. 2,516,565 which teaches the use of a fixed pulley at the tone arm pivot point connected by a belt to a pulley at the other end of the arm which rotates the playback stylus. The fixed pulley is half the size of the other pulley so that the stylus rotates at half the rate of the tone arm.

Applying this kind of linkage to a modern, low inertia, counterbalanced, high fidelity, gimbaled tone arm is very difficult, however, since the tone arm must track accurately with extremely light downward forces. The pulleys and belts tend to degrade these tracking dynamics.

This invention positions the pulleys in such a way that the tension of the belt does not affect the forces applied to the arm. The theoretically perfect tracking is therefore not compromised. The gimbal design is such that vertical arm motion also does not affect the accuracy of the lateral tracking.

BRIEF DESCRIPTION OF THE DRAWINGS

FIG. 1 is a diagram of the geometric principle employed by this invention.

FIG. 2 is a schematic top view of the tone arm of my invention.

FIG. 3 is a side view of one embodiment of the invention that provides a constant distance between the two pulleys so as to hold belt tension constant.

FIG. 4 is a cross section on line 4—4 in FIG. 3.

FIG. 5 is a schematic isometric view of another embodiment that holds belt tension constant.

DESCRIPTION OF THE PREFERRED EMBODIMENT

FIG. 1 diagrams a record 10, viewed from above, with a pickup mechanism 12 adapted to move across the surface of record 10 in an arc about pivot point P. Pickup 12 may comprise a typical phono cartridge mounted on a tone arm that pivots about and at P in a well known manner. The stylus on cartridge 12 starts at a point S and finishes at the center of the record at a point F. During this movement, the tone arm moves from the position of line PS to the position of line PF and sweeps through an angle B. Since PF is the same length as PS the remaining two angles A in triangle PFS equal each other. By positioning cartridge 12 over the center of the record it may be aligned parallel to line PF. As the tone arm swings out to position S, cartridge 12 must rotate relative to the tone arm through an angle X so as to always be perpendicular to the radial line FS. Hence, angle A plus angle X must always equal 90 degrees. From geometry it is known that the sum of the interior angles of any triangle is always 180 degrees. Thus:

$$2A + B = 180 = 2(90) = 2(A + X)$$

and therefore $$B = 2X$$

So if cartridge 12 rotates relative to the tone arm at an angular rate X which is half the angular rate B of the tone arm, it will remain perpendicular to line FS.

FIG. 2 shows a linkage for achieving the correct angular rotation. Cartridge 12 is mounted for rotation about a generally vertical axis at the end of a tone arm 16. Some type of rotating means is connected to cartridge 12. In this case, a pulley 24 is shown. Tone arm 16 is carried by a gimbal mechanism 14 of some sort and balanced by a counterweight 18 in a conventional fashion. Many types of gimbals are known in the prior art but all of them must permit arm 16 to pivot about both a vertical and horizontal axis with essentially no resistance so that arm 16 may track the record groove freely and accurately. A pulley 22 is provided at the point where arm 16 pivots in association with the gimbal. Pulley 22 is fixed against rotation about the vertical axis. Thus, when the arm 16 pivots about the vertical axis, pulley 22, being stationary, rotates relative to arm 16. A rotation transmission means, which may comprise a band or belt 26 encircling pulleys 22 and 24, couples this rotation to cartridge 12. Pulley 24 is twice the size of pulley 22 and so it rotates through only one half the angle of arm 16.

Several inherent design problems arise from the previous described linkage which do not find solutions in the prior art. Pulleys 22 and 24 should be kept as large as possible so as to insure good frictional contact with band 26, and to provide sufficient mechanical leverage to control cartridge 12, and so as to keep the two-to-one ratio between the pulleys constant. Pulleys that are too small are affected by the diameter of belt 26 itself and rotate with slightly altered ratios. Large bearings are desirable in the rotating means as well to provide low friction and smooth movement. Larger bearings and pulleys allow the tension in band 26 to be fairly low which is needed to avoid coupling vibrations from the gimbal mechanism, through band 26, to cartridge 12 thus creating noise. Low band tension also helps the bearings to work smoothly and silently. In general, the larger the bearings, the better. However, large pulleys, indeed, pulleys of any practical size at all, generate problems in geometry at the gimbal.

The tension in band 26 must not change with movements of the tone arm up and down, either as it tracks the record, or when records are changed. But it can be seen in FIG. 2 that if one fixes pulley 22 on a non-rotating shaft 20, movements of arm 16 up and down will change the distance between the pulleys and thus the tension will vary. Experimentation has shown this to be most detrimental to high quality sound reproduction. My invention proposes two approaches to holding the distance between the pulleys relatively constant. The first is shown in FIGS. 3 and 4.

FIG. 3 is partly cut away to show that a rotating means comprising a shaft 28 rides in bearings at both the top and bottom of arm 16 so that a pulley 30 can be mounted inside arm 16. Cartridge 12 mounts to the lower end of shaft 28. A belt 32 connects pulley 30 to a smaller pulley 40 mounted on a fixed shaft 34. Shaft 34 slides in a support collar 36 and is located by a set screw 38 at the correct height. A square support member or ring 42 sits on a collar 44 and is free to rotate about the shaft 34 and thus, about a vertical axis. A pair of horizontal shafts 46 extend in from member 42 so as to pivotally carry arm 16 for rotation about a generally horizontal axis. It can be seen in FIG. 4 that pulley 40 is positioned at a height on shaft 34 just coincident with the horizontal axis defined by shafts 46. Accordingly, band 32 engages pulley 40 at the horizontal axis which location does not change distance with respect to pulley 30 during up and down movements of arm 16. However, if shaft 34 is not at just the correct height, or with records that are warped, band 32 still may not lead fair onto pulley 40 at all times. This is because shaft 34 is fixed in place about the horizontal axis as well, even though the requirements of the cartridge movement system only demand that pulley 40 not rotate about a vertical axis. The second embodiment of my invention avoids this problem.

FIG. 5 shows a special gimbal design that holds the smaller pulley fixed about a vertical axis yet free to rotate otherwise so as to remain a constant distance from the larger cartridge pulley. Cartridge 12 is connected through a rotating means to a pulley 58. Tone arm 16 pivots around a vertical post 50. Post 50 is solidly mounted in a frame 52 which frame, in turn, pivots about a horizontal axis defined by pins 53 in supports 54. Post 50 is made thick enough to serve as a pulley so that a belt 56 can encircle it and pulley 58. As arm 16 pivots about post 50, belt 56 turns pulley 58, and cartridge 12, relative to arm 16 at half the rate of arm 16. Since belt 56, pulley 58, and post 50 move as a unit during rotation about the horizontal axis, so that the tension in belt 56 is unaffected, larger pulley diameters are easily employed.

Although this invention has been described with respect to audio record players, it is also applicable to the accurate playback of video discs as well, or magnetic discs, or any recording medium that is curved in format. Hence, the term record should be extended to cover all generally circular recording mediums and the term cartridge includes any type of mechanical, optical, or magnetic pickup mechanism.

I claim:

1. A tone arm system for a record player that maintains the pickup mechanism perpendicular to the groove radius, comprising;
   an arm having bearing means and being adapted to be mounted for pivoting movement above a record-carrying turntable;
   a pickup mechanism mounted on said arm on said bearing means that permits rotation of said pickup mechanism about a generally vertical stylus axis;
   first rotating means connected to said pickup mechanism so as to convey rotational movement to the pickup mechanism;
   a gimbal means having a first member, a second member, and a post rigidly attached to the first member in a generally vertical orientation, said gimbal means supporting said arm for pivoting movement about a generally vertical axis and a generally horizontal axis;
   a first pivot bearing supporting said arm for pivotal rotation about the generally vertical post, said first member supported for rotation about the generally horizontal axis by said second member;
   second rotating means, attached to said post so that it remains a constant distance from said first rotating means during rotation of said arm, and restrained from rotating about a vertical axis by said post so as to rotate relative to said arm when the arm pivots about said generally vertical post;
   rotation transmission means, connecting said first and second rotating means so that said first rotating means rotates in response to said second rotating means at one half the angular rate of said second rotating means relative to said arm.

2. The system of claim 1 in which said first rotating means comprises a pulley means, said second rotating means comprises a pulley means mounted on said post, and said rotation transmission means comprises a belt passing around both pulley means.

3. The system of claim 1 in which said second rotating means is the post.

4. The system of claim 1 in which said second member is a frame.

5. The system of claim 2 in which said second member is a frame.

* * * * *